United States Patent [19]

Isozaki et al.

[11] 4,385,097

[45] May 24, 1983

[54] ANTICORROSIVE COATING COMPOSITION

[75] Inventors: Osamu Isozaki; Shun-ichi Kodama, both of Hiratsuka, Japan

[73] Assignee: Kansai Paint Co., Ltd., Hyogo, Japan

[21] Appl. No.: 956,996

[22] Filed: Oct. 31, 1978

[30] Foreign Application Priority Data

Nov. 2, 1977 [JP] Japan .................. 52-131991

[51] Int. Cl.³ .............. B32B 15/08; C08K 5/04; C08K 5/17
[52] U.S. Cl. .................. 428/458; 252/389 R; 523/402; 523/414; 523/501; 524/571; 524/572; 524/591; 524/601; 524/604; 524/605; 524/609; 428/457; 428/461; 428/462

[58] Field of Search ............... 260/29.2 EP, 29.2 TN, 260/29.2 E, 29.6 M; 252/389 R; 523/402, 414, 501; 524/571, 572, 591, 601, 604, 605, 609, 904

[56] References Cited

U.S. PATENT DOCUMENTS 4,071,428 1/1978 Bosso et al. .................. 260/181 C
4,154,618 5/1979 Burke .......................... 260/29.6 M

FOREIGN PATENT DOCUMENTS 51-41897 11/1976 Japan .

Primary Examiner—Allan Lieberman
Attorney, Agent, or Firm—Wenderoth, Lind & Ponack

[57] ABSTRACT

An anticorrosive coating composition comprising (i) an aqueous medium, and dispersed therein, (ii) a water-soluble, film-forming and crosslinkable resin having a hydroxyl group and a proton-free onium salt radical and (iii) a chelate compound of titanium or zirconium.

11 Claims, No Drawings

ANTICORROSIVE COATING COMPOSITION

This invention relates to a novel coating composition, and more specifically, to an anticorrosive aqueous coating composition containing a water-soluble resin having both a hydroxyl group and a particular onium salt radical as a binder which is particularly useful for forming a highly anticorrosive resinous coating on the surface of a metal substrate.

Many aqueous coating compositions have been known heretofore. They contain as a resinous binder various types of resins such as resins emulsified by surface-active agents, resins water-solubilized by neutralization of carboxyl-containing resins with basic compounds, water-soluble resins obtained by neutralization of amino group-containing resins with acids, and water-dispersible resins prepared by a combination of these techniques.

However, since these resinous binders inherently contain a polar group in the resin skeleton, coated films prepared from coating compositions containing such resinous binders have poor corrosion resistance unless formed by special coating methods such as electrodeposition coating. It has been the previous practice therefore to make up for their low corrosion resistance ascribable to the polar groups of the resinous binder by incorporating large quantities of anticorrosive pigments such as strontium chromate, lead chromate, zinc chromate and zinc phosphate into these coating compositions.

It is also known to increase the water resistance of coated films prepared from coating compositions containing such water-soluble resins as a binder by incorporating a chelate compound of titanium or zirconium into these coating compositions and thereby inducing crosslinkage among functional groups present in the water-soluble resins (see, for example, Published Examined Japanese Patent Application No. 41897/76). However, even when the coated films are so crosslinked, they still have high hydrophilicity because of the large quantities of carboxyl or amino groups remaining after water-solubilization of the resins, and the water and corrosion resistances of the coatings have not been improved to any satisfactory degree.

It is an object of this invention to provide an anticorrosive coating composition which affords coatings having improved water and corrosion resistances.

Another object of this invention is to provide a novel anticorrosive coating composition which gives crosslinked coatings have very good water and corrosion resistances.

Still another object of this invention is to provide an anticorrosive water-base coating composition which gives crosslinked coatings having superior water and corrosion resistance and adhering firmly to a substrate.

Yet another object of this invention is to provide a method for forming a firmly adherent, crosslinked coating having superior water and corrosion resistances on the surface of a metal substrate.

A further object of this invention is to provide a metal substrate having on its surface a firmly adherent, crosslinked coating having superior water and corrosion resistances.

Other objects and advantages of this invention will become apparent from the following description.

According to this invention, there is provided an anticorrosive coating composition comprising (i) an aqueous medium, and dispersed therein, (ii) a water-soluble, film-forming and crosslinkable resin having a hydroxyl group and a proton-free onium salt radical and (iii) a chelate compound of titanium or zirconium.

The term "water-soluble" or "water-solubilized" resin, as used in the present specification and the appended claims, means not only a resin capable of forming a true solution in water, but also a resin capable of being finely "dispersed" in a stable condition in water in the form of colloid, micelle, etc.

An important feature of the present invention consists in the use of a water-soluble, film-forming and crosslinkable resin having a hydroxyl group and a proton-free onium salt radical as a binder resin.

It has been found in accordance with the present invention that a resin can be easily water-solubilized by introducing only a small amount of a proton-free onium salt radical, and some onium salt radicals can be easily cleaved off from the resin by heating; that by also introducing a hydroxyl group into the resin, the resulting hydroxyl-containing resin can be easily crosslinked by addition of a chelate compound of titanium or zirconium; and that therefore the resin having both a hydroxyl group and a proton-free onium salt radical is very suitable as a water-thinnable resinous binder for the preparation of an aqueous coating composition which will give a crosslinked coating having superior water and corrosion resistances.

In the present specification and the appended claims, the term "proton-free onium salt radical" denotes a monovalent group derived from a compound formed by the coordination bonding of a cationic reagent other than a proton to the lone electron pair of a lone electron pair-containing central atom such as nitrogen, oxygen or sulfur (this compound is called an onium salt or an onium compound) by removing one of the residues of the cationic reagent. In addition to the above-exemplified central atoms, phosphorus, arsenic, antimony, selenium and tin are also known to form onium salts. In the present invention, nitrogen, phosphorus and sulfur are suitable as the central element of onium salts.

Suitable proton-free onium salt radicals for use in this invention include quaternary onium salt radicals of the formula

wherein $Q_1$ represents a nitrogen or phosphorus atom; $R_1$, $R_2$ and $R_3$, independently from each other, represent an organic group; or when $Q_1$ is a nitrogen atom, $R_1$, $R_2$ and $R_3$ together may form a nitrogen-containing heterocyclic ring together with the nitrogen atom; and $Y_1^\ominus$ represents an anion, and tertiary onium salt radials of the formula

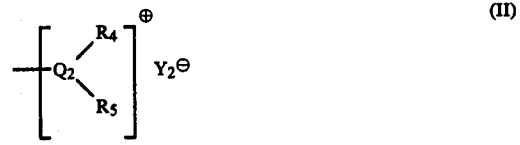

wherein $Q_2$ represents a sulfur atom; $R_4$ and $R_5$, independently from each other, represent an organic group, or $R_4$ and $R_5$ together may form a heterocyclic ring together with the sulfur atom; and $Y_2^\ominus$ represents an anion.

The organic groups represented by $R_1$, $R_2$ and $R_3$ or $R_4$ and $R_5$ in formula (I) or (II) may be any organic groups known in the field of ordinary onium salt-type cationic surface-active agents, such as aliphatic, alicyclic, aromatic or araliphatic hydrocarbon groups (e.g., alkyl, alkenyl, cycloalkyl, aryl or arakyl), or substituted hydrocarbon groups resulting from the replacement of at least one hydrogen atom of these hydrocarbon groups by a group having a relatively high hydrophilicity such as a hydroxyl, carboxyl, oxo or cyano group, or such substituted or unsubstituted hydrocarbon groups in which the carbon chain is interrupted by at least one hetero atom such as nitrogen, oxygen or sulfur.

Preferred organic groups include alkyl groups, especially lower alkyl groups such as methyl, ethyl, n- or iso-propyl, n-, iso-, sec- or tert-butyl, n-pentyl, and n-hexyl; hydroxyalkyl groups, especially lower hydroxyalkyl groups such as hydroxyethyl or hydroxypropyl; aryl groups such as phenyl, tolyl or xylyl, especially the phenyl group; and aralkyl groups, above all benzyl and phenethyl.

In formula (I) above, when $Q_1$ represents a nitrogen atom, $R_1$, $R_2$ and $R_3$ together may form a nitrogen-containing heterocyclic ring together with the nitrogen atom to which they are bonded. The heterocyclic ring may be mononuclear or polynuclear (preferably binuclear), and 5- to 12-membered. Preferably, the heterocyclic ring should not contain hereto atoms other than nitrogen atoms. Heteroaromatic rings, particularly a pyridine ring and mono-substituted pyridine rings having a lower alkyl (especially methyl) substituent, can be advantageously used as the heterocyclic rings.

In formula (II) above, $R_4$ and $R_5$ together may form a sulfur-containing heterocyclic ring together with the sulfur atom to which they are bonded. The heterocyclic ring may be mononuclear or polynuclear, and 5- to 12-membered. It may contain a hetero atom other than sulfur, for example a nitrogen atom. A thiophene ring is especially advantageously used as the heterocyclic ring.

Advantageously, the onium salt radicals of formula (I) or (II) should be split off from the base resin at the time of baking the resulting coating. For this purpose, the suitable content of carbon atoms in the three groups $R_1$, $R_2$ and $R_3$ of the radical (I) is not more than 25, preferably not more than 15, most preferably not more than 10, in total. Likewise, the suitable content of carbon atoms in the two groups $R_4$ and $R_5$ of the radical (II) is not more than 25, preferably not more than 15, most preferably not more than 10, in total.

The term "lower", as used in the present specification and the appended claims to modify groups, means that the groups qualified by this term have not more than 6 carbon atoms, preferably not more than 4 carbon atoms.

Examples of the anion $Y_1^\ominus$ or $Y_2^\ominus$ are halogen ions ($F^\ominus$, $Cl^\ominus$, $Br^\ominus$ and $I^\ominus$, preferably $Cl^\ominus$ and $Br^\ominus$), inorganic acid ions such as $NO_3^\ominus$, and organic acid ions such as $CH_3OCO^\ominus$, $C_2H_5OCO^\ominus$, $C_3H_7OCO^\ominus$, $C_6H_5OCO^\ominus$, $C_6H_5CH_2OCO^\ominus$, $CH_3CH(OH)OCO^\ominus$ and $C_6H_5O_2S^\ominus$. Of these, the halogen ions are preferred.

Thus, especially suitable proton-free onium salt radicals for use in this invention are quaternary ammonium salt radicals of the formula

wherein $R_{11}$, $R_{21}$ and $R_{31}$, independently from each other, represent an organic group, or $R_{11}$, $R_{21}$ and $R_{31}$ together may form a nitrogen-containing heteroaromatic ring together with the nitrogen atom to which they are bonded, the total carbon content of $R_{11}$, $R_{21}$ and $R_{31}$ being up to 25, and $Y_{11}^\ominus$ represents a halogen ion, especially those of the formula

wherein $R_{12}$, $R_{22}$ and $R_{32}$, independently from each other, represent a lower alkyl, lower hydroxyalkyl, phenyl, benzyl or phenethyl group and contain up to 15 carbon atoms in total, or $R_{12}$, $R_{22}$ and $R_{32}$ represent a pyridyl group together with the nitrogen atom to which they are bonded, said pyridyl group being optionally substituted by a lower alkyl group, and $Y_{12}^\ominus$ represents $Cl^\ominus$ or $Br^\ominus$, and tertiary sulfonium salt radicals of the formula $$\left[ \begin{array}{c} R_{41} \\ -S \\ R_{51} \end{array} \right]^\oplus Y_{21}^\ominus \qquad (II\text{-}a)$$

wherein $R_{41}$ and $R_{51}$, independently from each other, represent an organic group, or $R_{41}$ and $R_{51}$ together may form a sulfur-containing heterocyclic ring together with the sulfur atom to which they are bonded, the total carbon content of $R_{41}$ and $R_{51}$ being up to 25, and $Y_{21}^\ominus$ represents a halogen ion.

Typical examples of the proton-free onium salt radical of formula (I) or (II) are given below.

(1) Quaternary ammonium salt radicals ($Q_1 = N$)

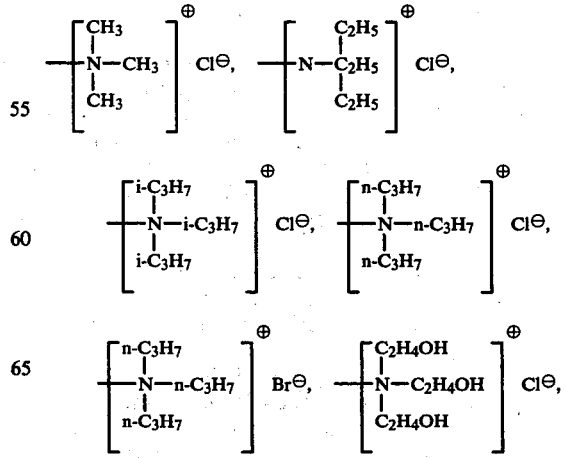

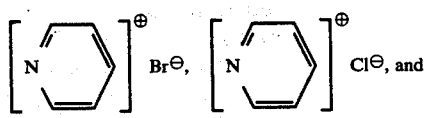

(2) Quaternary phosphonium salt radicals

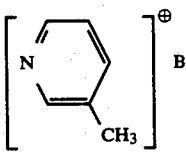

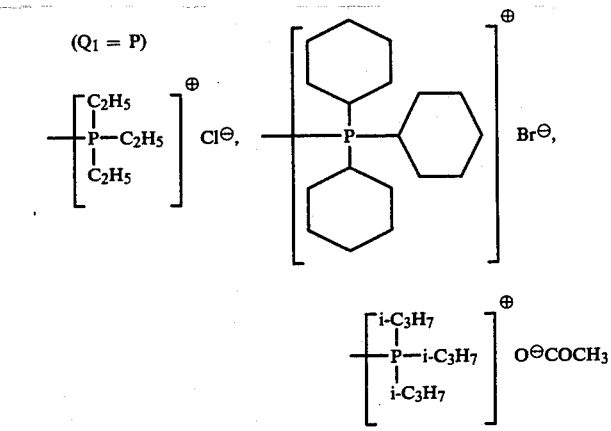

(3) Tertiary sulfonium salt radicals ($Q_2 = S$)

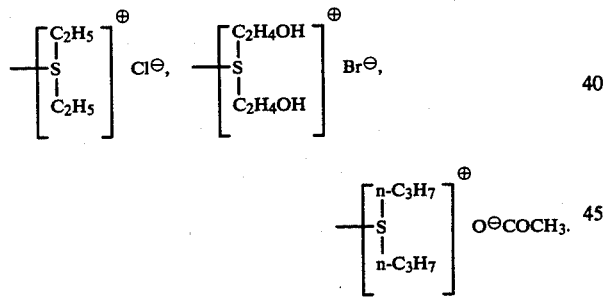

The proton-free onium salt radicals can be present in the water-soluble resin in numbers required to maintain the base resin water-soluble. The number of the proton-free onium salt radicals can be varied widely depending usually upon the type or molecular weight of the base resin and the type of the onium salt radicals. Generally, the water-soluble resin preferably has at least 0.1 mole of proton-free onium salt radical per kilogram of the resin. There is no upper limit to the number of the proton-free onium salt radicals. If there are too many proton-free onium salt radicals, no corresponding merit is obtained, but rather there is a possibility of adverse effects on the desirable properties of the resin. It is generally advantageous therefore that the number of the proton-free onium salt radicals should be at most 2 moles per kilogram of the base resin. The water-soluble resin may contain preferably 0.1 to 2, more preferably 0.3 to 1.0, moles of proton-free onium salt radicals per kilogram of resin.

The hydroxyl group becomes a crosslinking site for crosslinking the resin by reaction with a chelate compound of titanium or zirconium, and can be present in the resin in an amount effective for crosslinking. The amount of the hydroxyl groups varies according to the type or molecular weight of the resin. Generally, the hydroxyl groups can be present in an amount of at least 0.5 mole per kilogram of the resin. The upper limit to the number of the hydroxyl groups is not critical, but if too many hydroxyl groups are present, crosslinking will proceed excessively. Thus, the desirable number of the hydroxyl groups is up to 15, preferably 1 to 5, more preferably 2 to 3 moles, per kilogram of the resin.

In addition to the proton-free onium salt radicals and hydroxyl groups, the resin may contain other substituents which are inert to these groups. It should not contain active substituents such as carboxyl, phosphate, primary amino and secondary amino groups.

The molecular weight of the water-soluble resin used in this invention is not critical, and can be varied widely according to the type of the resin used. It can be selected from ranges usually known in the field of aqueous coating compositions or from those which are higher than these ranges. Resins having too high a molecular weight have reduced water solubility and cannot permit the formation of continuous and smooth coatings. Generally, suitable resins have a number average molecular weight of at most about 100,000.

The water-soluble resin that can be used as a resinous binder is not particularly limited in its type so far as it is film-forming. For example, it can be advantageously selected from polyamide resins, acrylic resins, polyester resins, polyurethane resins, epoxy resins, and modified diene resins.

The water-soluble and crosslinkable resins having a hydroxyl group and a proton-free onium salt radical which can be used in the invention are prepared by known methods from resins having functional groups which are readily available to those skilled in the art. For example, they can be produced by the following methods.

(1) Base resins having a hydroxyl group and a halogen atom are reacted with compounds having the formula

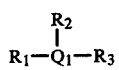   (III)

or

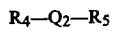   (IV)

wherein $Q_1$, $Q_2$, $R_1$, $R_2$, $R_3$, $R_4$ and $R_5$ have the meanings defined hereinabove;

(2) Base resins containing a hydroxyl group and a group of the formula

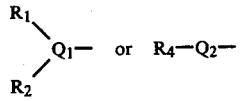

wherein $Q_1$, $Q_2$, $R_1$, $R_2$ and $R_4$ are defined hereinabove, are reacted with cationic reagents expressed by the formula

   (V)

or $$R_5Y_2 \quad \text{(VI)}$$

wherein $Y_1$, $Y_2$, $R_3$ and $R_5$ are as defined hereinabove.

(3) Base resins containing an epoxy group are treated with acid-addition salts of compounds of formula (III) or (IV).

Specific examples of the base resins containing a hydroxyl group and a halogen atom used as a starting material in the method (1) are given below.

(A) Acrylic resins

Acrylic resins which can be advantageously used in the present invention have a number average molecular weight of about 4,000 to about 40,000, preferably about 5,000 to about 20,000. Especially suitable acrylic resins are acrylic copolymers containing at least 0.5 mole %, preferably at least 1 mole %, of a recurring unit of the formula

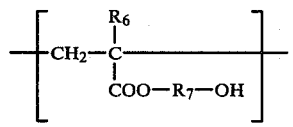

(VII)

wherein $R_6$ represents a hydrogen atom or a methyl group, and $R_7$ represents a lower alkylene group, and at least 0.1 mole %, preferably at least 0.3 mole %, of a halogen-containing recurring unit.

Examples of monomers which give the recurring unit of formula (VII) are 2-hydroxyethyl acrylate, 2-hydroxypropyl acrylate, 2-hydroxyethyl methacrylate, and 2-hydroxypropyl methacrylate. Monomers which give the halogen-containing recurring unit of formula (VII) include, for example, 3-chloro-2-hydroxypropyl acrylate, 3-bromo-2-hydroxypropyl acrylate, 3-chloropropyl acrylate, 3-bromopropyl acrylate, 2-chloroethyl acrylate, 2-bromoethyl acrylate, 3-chloro-2-hydroxypropyl methacrylate, and 3-bromo-2-hydroxypropyl methacrylate.

The above acrylic copolymer may contain a third recurring unit in addition to the two recurring units described hereinabove. Monomeric components which will give the third recurring unit include acrylate monomers such as methyl acrylate, ethyl acrylate, n-propyl acrylate, isopropyl acrylate, n-butyl acrylate, isobutyl acrylate and 2-ethylhexyl acrylate; methacrylate monomers such as methyl methacrylate, ethyl methacrylate, n-propyl methacrylate, isopropyl methacrylate, n-butyl methacrylate, isobutyl methacrylate, 2-ethylhexyl methacrylate and cyclohexyl methacrylate; aromatic vinyl monomers such as styrene and vinyl toluene; vinyl esters of carboxylic acids such as vinyl acetate and vinyl propionate; and unsaturated nitriles such as acrylonitrile and methacrylonitrile. These monomers may be present singly or if required, as a mixture of two or more.

(B) Polyester resins

Useful polyester resins have a number average molecular weight of preferably from about 1,000 to about 10,000, and include, for example, polyesters using an N-alkyl monoalkanolamine, N-alkyl dialkanolamine or trialkanolamine as at least a part of the alcohol component, and oil (e.g., linseed oil)-modified alkyd resins using an N-alkyl dialkanolamine as a part of the alcohol component.

The compounds of formula (III) or (IV) to be reacted with the aforesaid resins containing a hydroxyl group and a halogen atom include, for example, triethylamine, tri-n-butylamine, N-methyl diethanolamine, triethanolamine, dimethylethanolamine, N-methylpyridine, pyridine, picoline, and lutidine; trimethyl phosphine, triethyl phosphine, tripropyl phosphine, tributyl phosphine, and triphenyl phosphine; and diethyl sulfide, dipropyl sulfide, dibutyl sulfide, diphenyl sulfide, dibenzyl sulfide and thiodiethanol.

The reaction of the base resin containing a hydroxyl group and a halogen atom with the compound of formula (III) or (IV) can be performed in a suitable inert solvent at a temperature of about 50° to about 200° C., preferably about 80° to about 180° C., for 1 to 24 hours.

Typical examples of the base resin containing a group of the formula

or $R_4$—$Q_2$— (for example, a tertiary amino, tertiary phosphino or organic mercapto group) and a hydroxyl group which can be used as a starting material in the method (2) are given below.

(C) Polyamide resins

Polyamide resins which can be used advantageously in this invention have a number average molecular weight of about 1,000 to 10,000, preferably 1,500 to 5,000. These polyamide resins must contain both the group of the formula

or $R_4$—$Q_2$— and a hydroxyl group in the molecule. They can be prepared, for example, by condensing dicarboxylic acids such as phthalic acid, adipic acid, sebacic acid or dimeric fatty acids with polyamines such as ethylenediamine, hexamethylenediamine or diethylenetriamine to form carboxyl-terminated polyamides, and further reacting the carboxyl-terminated polyamides with hydroxy compounds containing both a hydroxyalkyl group and a teriary amino, phosphino or mercapto group such as N-methyl diethanolamine.

(D) Acrylic resins

Acrylic resins that can be advantageously used in the present invention have a number average molecular weight of about 4,000 to about 40,000, preferably about 5,000 to about 20,000. Especially suitable acrylic resins are acrylic homo- or copolymers containing at least 0.5 mole %, preferably at least 1 mole %, of a recurring unit of the formula

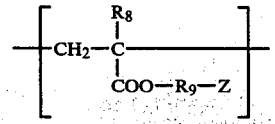

(VIII)

wherein $R_8$ represents a hydrogen atom or a methyl group, $R_9$ represents a lower alkylene group which is unsubstituted or substituted by a hydroxyl group and Z represents the group

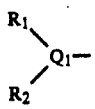

or R$_4$—Q$_2$— in which Q$_1$, Q$_2$, R$_1$, R$_2$ and R$_4$ are the same as defined above, and at least 0.5mole %, preferably at least 1 mole %, of a hydroxyl-containing recurring unit. When in formula (VIII) R$_9$ represents a hydroxyl substituted lower alkylene group, this hydroxyl-containing unit is not essential.

Monomers which give the recurring unit of formula (VIII) include

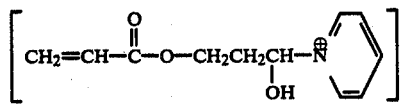

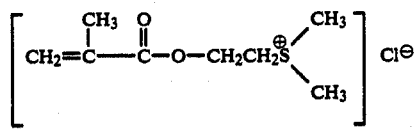

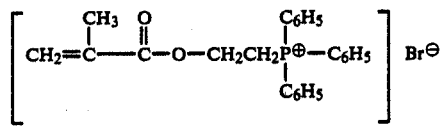

Examples of monomers which give the hydroxy-containing unit are hydroxyethyl acrylate, hydroxypropyl acrylate, hydroxyethyl methacrylate, and hydroxypropyl methacrylate.

The copolymer may contain a third recurring unit in addition to the two recurring units described above. The monomers illustrated in section (A) hereinabove can also be used to give such a third recurring unit.

(E) Polyurethane resins

These resins can be advantageously used to provide base resins containing a tertiary amino group and a hydroxyl group.

Useful polyurethane resins have a number average molecular weight of preferably about 1,000 to 10,000, for example polyurethane resins having aminoalcohols such as N-alkyl monoalkanolamines, N-alkyl dialkanolamines, or trialkanolamines added to their terminals. They specifically include products obtained by the action of the aforesaid aminoalcohols on isocyanate-terminated polyurethane resins obtained by reacting di- or polyisocyanate compounds such as tolylene diisocyanate, xylylene diisocyanate, hexamethylene diisocyanate, lysine diisocyanate, isophorone diisocyanate, diphenylmethane-4,4'-diisocyanate, dicyclohexylmethane-4,4'-diisocyanate, triphenylmethane triisocyanate and compounds of the formula H$_5$C$_2$C(CHOCONHC$_6$H$_3$-CH$_3$NCO)$_3$ and OCN(CH$_2$)$_6$N[CONH(CH$_2$)$_6$NOC]$_2$ with polyhydric alcohol components such as ethylene glycol, propylene glycol, 2,2-dimethyl propanediol, butanediol, 1,5-pentanediol, 1,6-hexanediol, 2-methylpentane-2,4-diol, polyethylene glycols with a number average molecular weight of less than 3,000, polypropylene glycols with a number average molecular weight of less than 3,000, glycerol, trimethylolethane(1,1,1-tris-hydroxymethylethane), trimethylolpropane(1,1,1-tris-hydroxymethylpropane), and pentaertythritol.

(F) Other resins

Base resins containing the group

or R$_4$—Q$_2$— and a hydroxyl group can also be prepared from epoxy-containing resins to be described hereinbelow by the reaction schematically shown below.

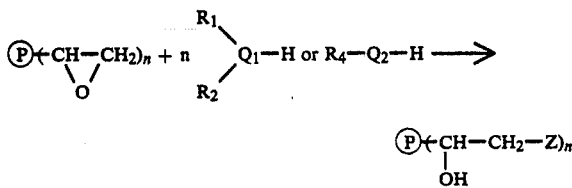

wherein Ⓟ represents the main structure of an epoxy-containing resin remaining after removal of epoxy groups from it, Z represents a group of the formula

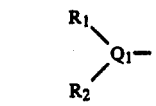

or R$_4$—Q$_2$—, and n is a number of at least 1.

The cationic reagents of formula (V) or (VI) to be reacted with the resins described in (C), (D) and (E) include, for example, C$_2$–C$_{15}$ alkyl halides such as i-butyl chloride, n-butyl bromide and hexyl chloride; and aralkyl halides such as benzyl chloride, benzyl bromide and phenethyl chloride.

The reaction of these cationic reagents with the above resins can be performed in a suitable inert solvent for about 1 to 24 hours at a temperature within the range of about 50° to about 200° C., preferably about 80° to about 180° C.

Examples of the epoxy-containing resins that can be used as a starting resin in method (3) include the following.

(G) Epoxy-containing acrylic resins

These acrylic resins may have the same molecular weight as described in (A) or (D) above. Especially suitable epoxy-containing acrylic resins are acrylic copolymers containing at least 0.1 mole %, preferably at least 0.3 mole %, of a recurring unit of the formula

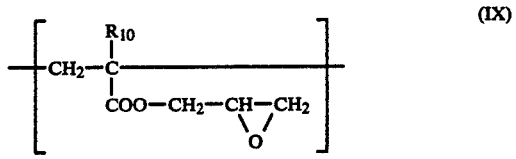

wherein R$_{10}$ represents a hydrogen atom or a methyl group.

The other monomeric component which constitutes the copolymer may be those which are described in section (A) above.

(H) Epoxy resins

Useful epoxy resins have a number average molecular weight of 300 to 10,000. They include, for example, bisphenol A-type epoxy resins, bisphenol F-type epoxy resins, novolac-type glycidyl ether epoxy resins, and diglycidyl ester-type epoxy resins. Specific examples are Epikote #1001 and Epikote #1007 (trademarks of Shell Chemical Co.).

(I) Epoxy-modified diene resins and other epoxy resins

Examples of these resins are epoxidized linseed oil obtained by oxidizing linseed oil with peracetic acid, and epoxidized butadiene obtained by poly-addition reaction between carboxyl-terminated 1,2- or 1,4-polybutadiene having a number average molecular weight of 500 to 4,000 and epoxy resins containing at least two epoxy groups and having a number average molecular weight of 300 to 1,000 such as those described in section (G).

The reaction of the resins described in sections (G), (H) and (I) with the acid-addition salt of the compound of formula (III) or (IV) can be performed in a customary manner at about 50° to about 200° C., preferably about 80° C. to about 180° C., for about 1 to 24 hours. Examples of the acid which forms the acid addition salt with the compound of formula (III) or (IV) include inorganic acids such as hydrochloric acid, phosphoric acid and boric acid, and organic acids such as acetic acid, propionic acid and lactic acid.

The chelate compound of titanium or zirconium to be used together with the water-soluble and crosslinkable resin containing both a hydroxyl group and a proton-free onium salt radical described above is known, and can be selected from those which are commercially available.

In particular, compounds obtained by treating organic titanates or zirconates with chelating agents are suitable. Suitable organic titanates or zirconates are those of the following formula

wherein M is a titanium or zirconium atom, and G represents a $C_1-C_{25}$ alkyl group which may be substituted by a hydroxyl group. Specific examples include tetra-isopropyl titanate, tetra-n-butyl titanate, tetrakis(2-ethylhexyl) titanate, tetrastearyl titanate, tetraisopropyl zirconate, tetra-n-butyl zirconate, and tetrastearyl zirconate. Of these, tetra-isopropyl titanate, tetra-isopropyl zirconate, tetra-n-butyl titanate and tetra-n-butyl zirconate are preferred.

Examples of the chelating agent to be reacted with the organic titanate or zirconate include tri(lower alkanol) amines such as triethanolamine, acetoacetic acid esters such as methyl acetoacetate and ethyl acetoacetate, diketone alcohols such as diacetone alcohol, acylketones such as acetylacetone, glycols such as octylene glycol, and hydroxycarboxylic acids such as lactic acid. Of these, acetylacetone and triethanolamine are preferred.

Thus, typical examples of the chelate compound of titanium or zirconium which can be used advantageously in this invention are di-isopropoxy bis(acetylacetone) titanate, di-n-butoxy bis(triethanolamine) titanate, tetrakis-acetylacetone zirconate, and tetrakis-triethanolamine zirconate.

These chelate compounds can be used either singly or as a mixture of two or more.

The amount of the chelate compound can be varied according to the type of the resinous binder. Generally, the amount of the chelate compound is 1 to 30 parts by weight, preferably 2 to 10 parts by weight, and more preferably 3 to 5 parts by weight, per 100 parts by weight of the water-soluble resin.

The coating composition of this invention can be prepared by adding the water-soluble and crosslinkable resin and the chelate compound to an aqueous medium to dissolve or disperse these ingredients uniformly in the medium. Usable aqueous media are, for example, water or a mixture of water with a water-miscible organic solvent, particularly an alcohol such as methanol, ethanol, isopropanol, ethylene glycol, ethylene glycol monoethyl ether, ethylene glycol monobutyl ether, diethylene glycol monoethyl ether, and diethylene glycol monobutyl ether, (the water content of the mixture is preferably at least 70% by weight).

If desired, the coating composition of this invention may further contain a coloring pigment such as titanium white, carbon black or red iron oxide, an extender pigment such as talc, calcium carbonate, mica or clay, an anticorrosive pigment such as chromates or phosphates, and a rust inhibitor such as thiourea and lead acetate. Furthermore, to aid in the crosslinking of the resin with the chelate compound, a crosslinking agent capable of reacting with a hydroxyl group such as blocked isocyanates and water-soluble aminoplasts can be incorporated. Or if desired, another water-soluble resin compatible with the water-soluble resin may be incorporated.

The concentration of the water-soluble binder resin in the composition is not strictly restricted, and can be varied widely according, for example, to the type of the resin used, and to process parameters in electrodeposition. Generally, it is 3 to 30% by weight, preferably 5 to 15% by weight, based on the weight of the composition.

The coating composition of the invention may have a solids content of generally 5 to 70% by weight, preferably 40 to 60% by weight.

Since the proton-free onium salt radicals introduced into the resinous binder of the coating composition of this invention have a far greater ability to water-solubilize the resin than conventional water-solubilizing groups (amino groups to neutralize carboxyl groups, or carboxyl groups to neutralize amino groups) used heretofore for water solubilization of resins, smaller amounts (about 1/10 to about ⅓ of the amounts of the conventional water-solubilizing groups) of the proton-free onium salt radicals can give water-soluble resins. Furthermore, as is well known, the onium salt radicals themselves have a corrosion inhibiting action, and can be cleaved off by heating. It is possible therefore to afford tough coatings having a low water absorption (i.e., superior water resistance) and very good corrosion resistance and firmly adhering to a substrate.

Thus, the coating composition of this invention can be used as an anticorrosive paint to form coatings of superior water and corrosion resistances on the surfaces of various substrates, particularly metal substrates such as steel, aluminum, zinc or chromium.

The coating applied to the surface of a substrate gradually cures even at ordinary temperatures to form a crosslinked coating. Advantageously, however, it is baked at a temperature of at least 40° C., preferably 80° to 200° C., for a period of about 10 to 30 minutes to form a tougher coating.

The coating composition of this invention can be applied to a substrate surface in a customary manner, for example, by spray coating, brush coating, dipping, roll coating, curtain flow coating or cationic electrodeposition. Sufficiently high anticorrosive and water-resistant effects can be attained when the film thickness is generally 1 to 100 microns, preferably 5 to 50 microns, more preferably 20 to 30 microns for a single coating system.

The following examples further illustrate the present invention. All parts and percentages are by weight.

EXAMPLE 1

Triphenyl phosphine (30 parts) was added to 200 parts of a 70% butanol solution of NOIMER M copolymer having a molecular weight of about 10,000 (a trademark for an acrylic copolymer composed of 3-chloro-2-hydroxypropyl methacrylate, acrylate and methacrylate monomers, a product of Riken Vitamin Oil Co., Ltd.). The solution was stirred at 80° C. for 24 hours. After the reaction, distilled water was added to the solution to a solids content of 40% to afford an opalescent solution having a viscosity of P (determined by a Gardner bubble viscometer; the same method of viscosity measurement was used throughout the following examples). The solution contained 0.8 mole of triphenyl phosphonium salt radicals and 10 moles of hydroxyl groups, per kilogram of resin.

One part of triethanolamine/tetrabutyl titanate chelate was added to 100 parts of the resulting solution, and the mixture was coated to a dry film thickness of about 20 microns on a polished mild steel sheet, and baked at 150° C. for 30 minutes. Crosscuts were provided in the resulting coated steel sheet, and it was subjected to salt spray (in accordance with JIS Z2371; the same method was used throughout the following examples) for 10 days. The maximum corroded width of the crosscut portion was 3 mm.

EXAMPLE 2

Ten parts of 2-bromo-isopropanol was added to 100 parts of TOHMIDE 225X (a trademark for an amino radical-containing polyamide resin, average molecular weight about 1,000, a product of Fuji Chemical Industry Co., Ltd.), and they were reacted at 150° C. for 10 hours. Distilled water was added to the reaction product to dilute it to a solids content of 40% to afford a clear aqueous solution having a viscosity of H which contained 1.0 mole of quaternary ammonium salt radical and 1.0 mole of hydroxyl group per kilogram of resin.

To 100 parts of the resulting solution was added 8 parts of acetylacetone/tetraethyl titanate chelate. The mixture was coated to a dry film thickness of about 20 microns on a polished mild steel sheet, and allowed to stand for 24 hours at room temperature. The resulting coated steel sheet was subjected to salt spray for 10 days. The maximum corroded width at the crosscut portion was 3 mm.

EXAMPLE 3

Five parts of triethylamine hydrochloride was added to 100 parts of a 50% methyl cellosolve acetate solution of Epikote #1001 having a molecular weight of about 1,000 (a trademark for an epoxy resin, a product of Shell Chemical Co.), and they were reacted at 120° C. for 24 hours. Distilled water was added to the reaction product to dilute it to a solids content of 20% to afford an opalescent aqueous solution having a viscosity of B which contained 0.5 mole of quaternary ammonium salt radical and 4 moles of hydroxyl groups per kilogram of resin.

One part of ethyl acetoacetate/tetrabutyl zirconate chelate was added to 100 parts of the resulting aqueous solution. The mixture was coated to a dry film thickness of about 20 microns on a polished mild steel sheet, and baked at 190° C. for 20 minutes. The resulting coated steel sheet was subjected to salt spray for 10 days. The maximum corroded width of the crosscut portion was 3 mm.

COMPARATIVE EXAMPLE 1

Five parts of diisopropylamine was added to 100 parts of a 50% methyl cellosolve acetate solution of Epikote #1001, and they were reacted at 120° C. for 12 hours. Distilled water was added to the reaction product to dilute it to a solids content of 20% to afford a white solution having a viscosity of F to G. One part of ethyl acetoacetate/tetrabutyl zirconate chelate was added to 100 parts of the resulting solution. The mixture was coated to a dry film thickness of about 20 microns on a polished mild steel sheet, and baked at 190° C. for 20 minutes. The resulting coated steel sheet was subjected to salt spray. In three days, the coated film completely peeled off from the substrate.

COMPARATIVE EXAMPLE 2

To 100 parts of the aqueous solution having a viscosity of B prepared in Example 3 was added 5 parts of Cymel #370 (a trademark for a water-soluble, methanol etherified melamine formaldehyde resin, a product of Mitsui Toatsu Chemical Co., Ltd.) instead of 1 part of the chelate compound. The mixture was coated to a dry film thickness of about 20 microns on a polished mild steel sheet, and baked at 170° C. for 30 minutes. The resulting coated steel sheet was subjected to salt spray for 10 days. The maximum corroded width of the crosscut portion was 8 to 10 mm.

What is claimed is:

1. An anticorrosive coating composition having a solids content of 5 to 70% by weight, and comprising:
   (i) an aqueous medium, and dispersed therein,
   (ii) 3 to 30% by weight of a water-soluble, film-forming and crosslinkable resin having at least 0.5 mole of hydroxyl group per kilogram of the resin and at least 0.1 mole of proton-free onium salt radical per kilogram of the resin, said proton-free onium salt radical having a central element selected from the group consisting of nitrogen, phosphorus and sulfur, said resin being free of carboxyl, phosphate, primary amino and secondary amino groups, and
   (iii) 1 to 30 parts by weight of a chelate compound of titanium or zirconium per 100 parts by weight of the resin, wherein the chelate compound is a chelate compound of a alkyl titanate or alkyl zirconate with a chelating agent selected from the group consisting of tie (lower alkanol) amines, acetoacetic acid esters, diketone alcohols, acylketones, glycols and hydroxy carboxylic acids.

2. The composition of claim 1 wherein the proton-free onium salt radical is a quaternary onium salt radical of the formula

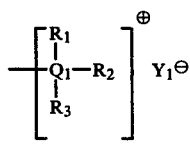

wherein $Q_1$ represents a nitrogen or phosphorus atom; $R_1$, $R_2$ and $R_3$, independently from each other, represent an organic group; or when $Q_1$ is a nitrogen atom, $R_1$, $R_2$ and $R_3$ together may form a nitrogen-containing heterocyclic ring together with the nitrogen atom; and $Y_1^\ominus$ represents an anion, or a tertiary onium salt radical of the formula

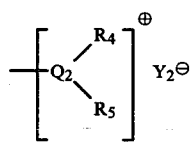

wherein $Q_2$ represents a sulfur atom; $R_4$ and $R_5$, independently from each other, represent an organic group, or $R_4$ and $R_5$ together may form a heterocyclic ring together with the sulfur atom; and $Y_2^\ominus$ represents an anion.

3. The coating composition of claim 1 wherein the proton-free onium salt radical is a quaternary ammonium salt radical of the formula

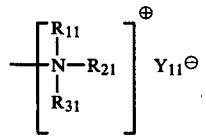

wherein $R_{11}$, $R_{21}$ and $R_{31}$, independently from each other, represent an organic group, or $R_{11}$, $R_{21}$ and $R_{31}$ together may form a nitrogen-containing heteroaromatic ring together with the nitrogen atom to which they are bonded, the total carbon content of $R_{11}$, $R_{21}$ and $R_{31}$ being up to 25, and $Y_{11}^\ominus$ represents a halogen ion.

4. The composition of claim 1 wherein the proton-free onium salt radical is a tertiary sulfonium salt radical of the formula

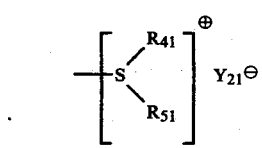

wherein $R_{41}$ and $R_{51}$, independently from each other, represent an organic group, or $R_{41}$ and $R_{51}$ together may form a sulfur-containing heterocyclic ring together with the sulfur atom to which they are bonded, the total carbon content of $R_{41}$ and $R_{51}$ being up to 25, and $Y_{21}^\ominus$ represents a halogen ion.

5. The composition of claim 1 wherein the resin contains the proton-free onium salt radical in an amount of the 0.1 to 2 moles per kilogram of resin.

6. The composition of claim 1 wherein the resin contains 1 to 5 moles of hydroxyl groups per kilogram of the resin.

7. The composition of claim 1 wherein the resin has a number average molecular weight of at most 100,000.

8. The composition of claim 1 wherein the resin is derived from a member selected from the group consisting of polyamide resins, acrylic resins, polyester resins, polyurethane resins, epoxy resins and modified diene resins.

9. The composition of claim 1 wherein the amount of the chelate compound is 2 to 10 parts by weight per 100 parts by weight of the resin.

10. A method for forming a coating having corrosion resistance on the surface of a metal substrate which comprises
(A) applying to the substrate surface a coating composition having a solids content of 5 to 70% by weight, and comprising:
  (i) an aqueous medium, and dispersed therein,
  (ii) 3 to 30% by weight of a water-soluble, film-forming and crosslinkable resin having at least 0.5 mole of hydroxyl group per kilogram of the resin and at least 0.1 mole of proton-free onium salt radical per kilogram of the resin, said proton-free onium salt radical having a central element selected from the group consisting of nitrogen, phosphorus and sulfur, said resin being free of carboxyl, phosphate, primary amino and secondary amino groups, and
  (iii) 1 to 30 parts by weight of a chelate compound of titanium or zirconium per 100 parts by weight of the resin wherein the chelate compound is a chelate compound of an alkyl titanate or alkyl zirconate with a chelating agent selected from the group consisting of tri (lowere alkanol) amines, acetoacetic acid esters, diketone alcohols, acylketones, glycols and hydroxy carboxylic acids, and
(B) baking the coating at a temperature of at least 40° C.

11. A coated metal substrate prepared by the method of claim 10.

* * * * *